Feb. 13, 1934.                O. F. HOMEIER                1,947,202
                           EXTRUDING MACHINE HEAD
                           Filed March 24, 1933
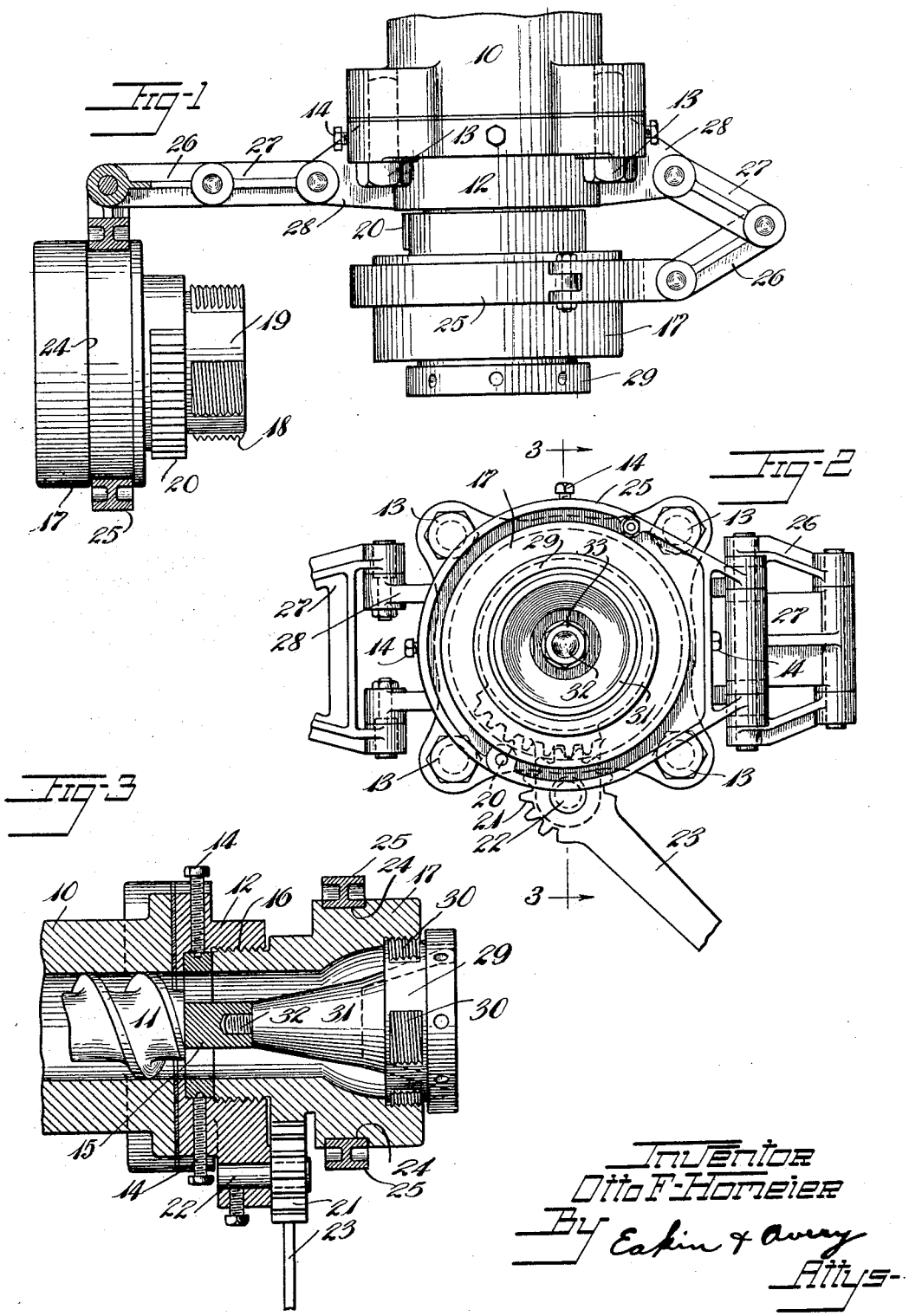

Patented Feb. 13, 1934

1,947,202

UNITED STATES PATENT OFFICE 1,947,202

EXTRUDING MACHINE HEAD

Otto F. Homeier, Akron, Ohio, assignor to The B. F. Goodrich Company, New York, N. Y., a corporation of New York Application March 24, 1933. Serial No. 662,463

4 Claims. (Cl. 18—12)

This invention relates to extruding machines such as are used for forming rubber or other plastic compounds to continuous lengths of definite cross-sectional shape and area, and more especially relates to die-supporting heads for such machines.

Extruding machines are ordinarily provided with die heads through which the plastic material is forced and shaped. It is necessary to often change the dies during the operation of the machine and on machines of large size where the dies are of great mass, the operations of removing and replacing the dies consumes a large amount of time and necessitates the use of hoisting equipment. Great care is necessary in properly adjusting the dies, as they are easily injured by abuse.

The principal objects of this invention are to provide economy and efficiency by eliminating the use of extraneous hoisting means, to provide for changing the dies without delay and without disturbing their proper alignment and to prevent injury to the dies during the die-changing operation.

Other objects will appear from the following description and the accompanying drawing.

In the drawing:

Fig. 1 is a plan view of the delivery end of an extruding machine having a die-supporting head made in accordance with the invention, the remainder of the machine being broken away.

Fig. 2 is an end elevation of the same, parts being broken away.

Fig. 3 is a vertical section taken on line 3—3 of Fig. 2, only a part of the extruding machine cylinder and screw being shown, the remainder being broken away.

Referring to the drawing, the numeral 10 designates the cylinder of an extruding machine adapted to hold the plastic material, and the numeral 11 designates the forcing screw whereby the material is advanced along the cylinder.

To provide for supporting the dies in relation to the cylinder a die-head 12 is secured to the cylinder by bolts 13. It is provided with a plurality of radially disposed centering screws 14 whereby a core-supporting spider 15 may be centered and supported, and has an interrupted inclined surface or internal thread 16 for engaging a die.

Each of the dies 17, which are adapted to interchangeably engage the die head, is provided with a corresponding inclined surface or external thread 18, interrupted as at 19 to permit removal after rotation of less than a full turn, and is also provided with a segmental gear 20 on its unthreaded projecting portion.

To rotate the die 17 for tightening or loosening the die, a pinion 21 is rotatably mounted upon a stud 22 carried by die head 12, and engages the gear segment 20. A hand lever 23 is formed integral with pinion 21 for rotating the pinion.

In order to support the dies either when not in use or while being changed so as to avoid the use of lifting devices and to prevent damage to the dies, each die is formed with an annular groove 24 which is rotatably embraced by a swivel ring 25. Ring 25 is supported to swing to and from the die-support 12 by a crane arm comprising a pair of articulated links 26 and 27 which is pivotally supported from ears 28 formed on the die-head 12.

Each die 17 is preferably provided with a removable orifice plate 29 to which it is engaged by an interrupted thread 30. This permits changes being made in the die without removing the entire die from the machine.

The core 31 is also removable and is held in place by a stud 32, which passes through the core and is secured in the spider 15, and a nut 33 accessible from without.

Where the dies 17 are adjusted to produce the same extruded product and one die is being used, should prevulcanization of the rubber compound or other difficulties necessitate clearing of the die, lever 23 may be manipulated to release the die, which may be immediately swung out of the way. The other die may be swung into place and production continued with only slight interruption of production. The first die may then be cleaned while the second die is being used.

Where dies of different sizes are used, they may be changed in similar manner with only slight delay in production when a change in size of the product is required.

I claim:

1. An extruding machine comprising an extruding cylinder, a die-supporting head therefor, a pair of dies hinged to said head for selective engagement with said head, and means for detachably locking said head to either of said dies.

2. An extruding machine comprising an extruding cylinder having a die supporting head, a die detachably engageable therewith, and an arm pivoted to said head and adapted to support said die either when engaged by the head or when removed therefrom.

3. An extruding machine comprising an extruding cylinder having a die-supporting head threaded to retain a die, a die engageable therewith, a crane arm pivoted to said head, and a swivel ring carried thereby and adapted to rotatably support the die.

4. An extruding machine comprising an extruding cylinder having a die-supporting head, a die engageable therewith, an articulated crane arm pivoted on said head, and a swivel ring carried by said arm and adapted to support the die.

OTTO F. HOMEIER.